Nov. 1, 1927.
E. T. FERNGREN
1,647,403
METHOD AND APPARATUS FOR DRAWING SHEET GLASS
Filed Oct. 29, 1924   2 Sheets-Sheet 1
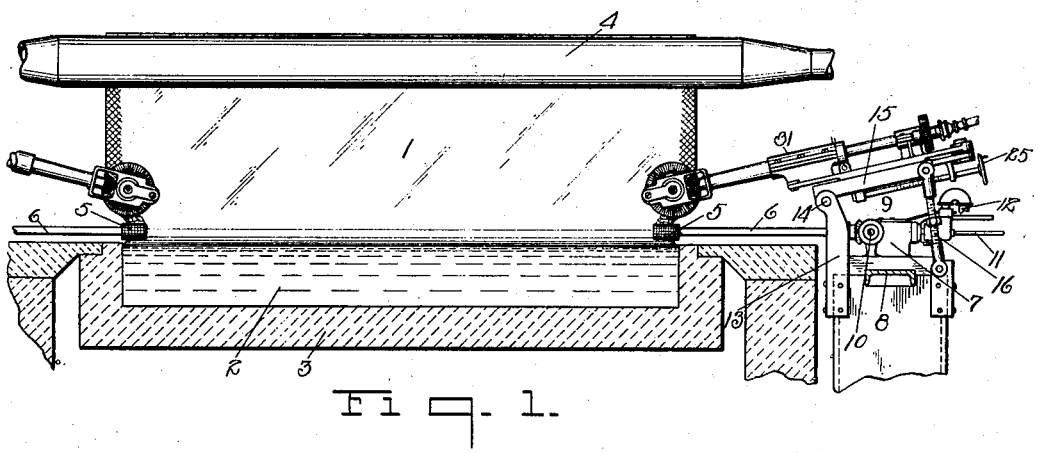
Fig. 1.
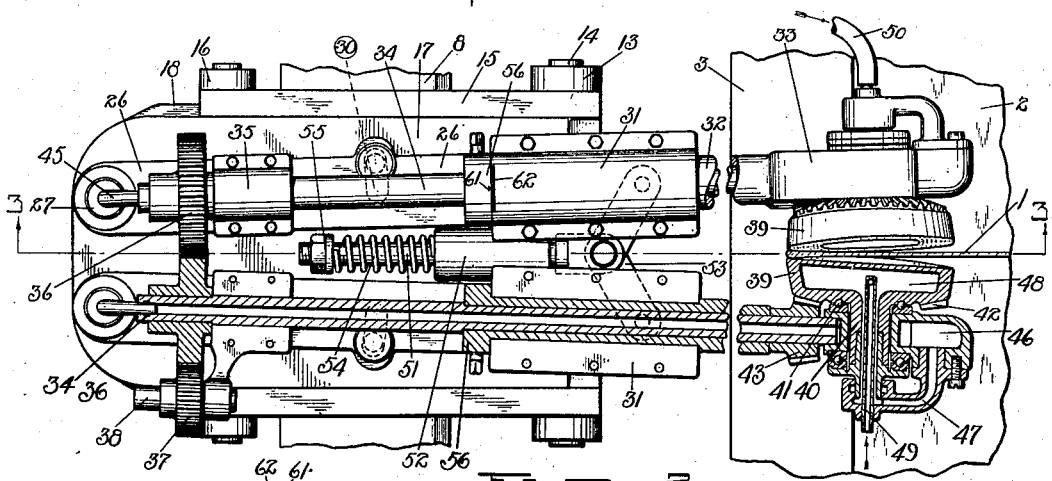
Fig. 2.
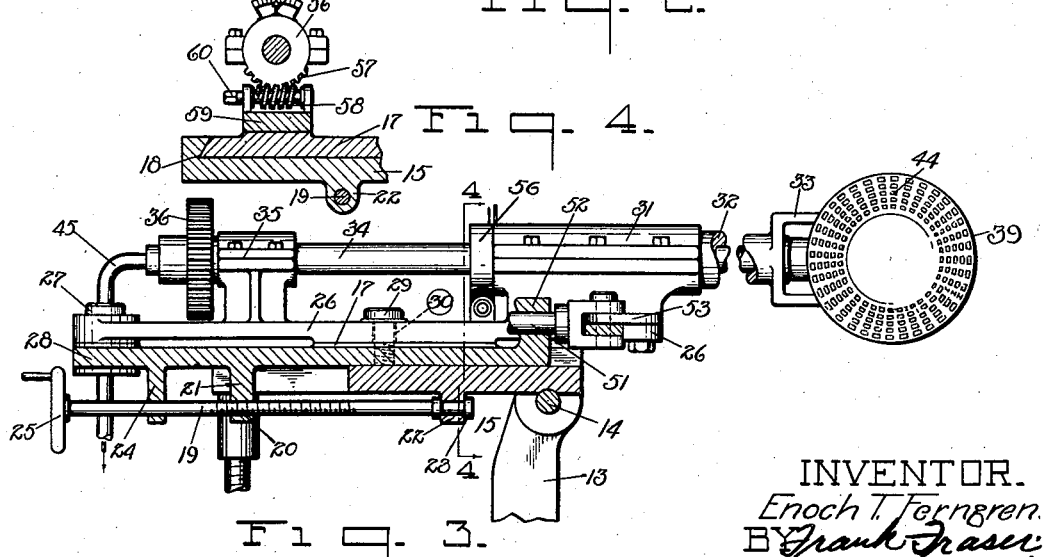
Fig. 4.
Fig. 3.
INVENTOR.
Enoch T. Ferngren.
BY Frank Fraser
ATTORNEY.

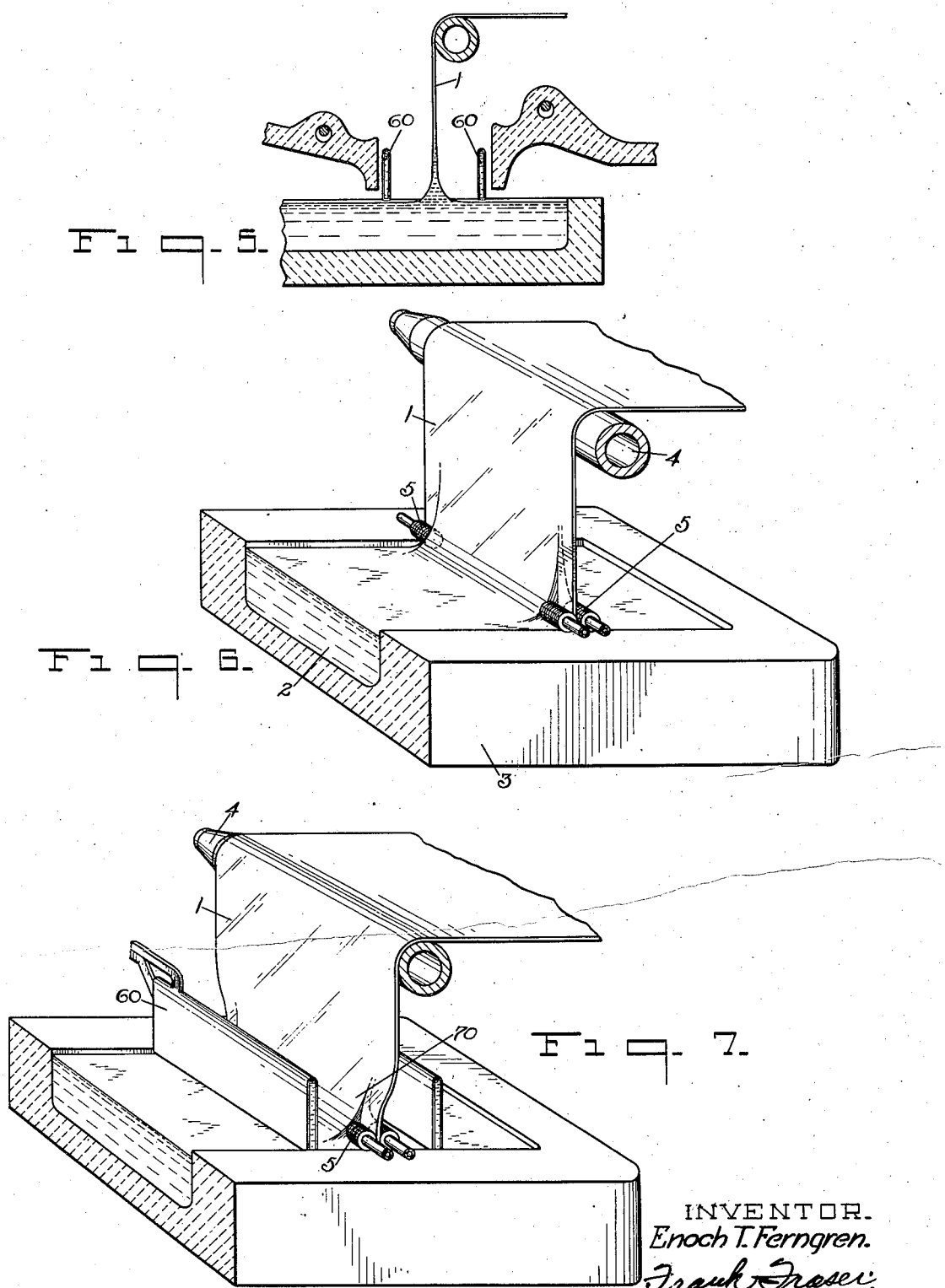

Patented Nov. 1, 1927.

1,647,403

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR DRAWING SHEET GLASS.

Application filed October 29, 1924. Serial No. 746,654.

This invention relates to the art of drawing sheet glass, and more particularly to an improved process and apparatus for drawing a mass of glass into sheet form from a pool of molten glass, and at the same time advancing and stretching this glass laterally during the formative period in the sheet drawing operation.

More particularly a pair of members with their adjacent sheet-engaging faces slightly tilted with respect to each other, are positioned directly above the sheet edge forming devices in such a manner that the plastic glass forming the sheet edge, which is fed up by these devices, will be grasped between the pair of members and drawn upwardly and outwardly while still plastic.

The principal objects and advantages of the invention are to provide a wider sheet, a speedier draw of sheet and increased drawing rate in the edge glass which will reduce the tendency for stagnation adjacent the sides of the pot containing the pool of molten glass, and to reduce waves and other thickness variations in the sheet to a minimum, so far as such defects are caused by the usual lateral contraction of the sheet glass during its longitudinal attenuation.

Other objects and advantages of the invention will become apparent during the course of the following description.

In the drawings wherein like numerals are employed to designate like parts throughout the same.

Fig. 1 is a transverse vertical section through the pot containing the pool of molten glass, the glass sheet and the sheet stretching mechanism forming the subject-matter of the invention being shown in elevation.

Fig. 2 is a plan view of one of the sheet stretching devices, part of the apparatus being in section for the purposes of illustration.

Fig. 3 is a transverse vertical section through the mechanism taken substantially on line 3—3 of Fig. 2.

Fig. 4 is a partial transverse section of a detail taken substantially on line 4—4 of Fig. 3.

Fig. 5 is a fragmentary sectional view showing the meniscus formation of the glass during the drawing operation.

Fig. 6 is a fragmentary perspective view showing the formation of the sheet prior to the addition or section of my improved apparatus.

Fig. 7 shows the formation of the sheet with my improved apparatus, the parts for obtaining the results being left out for the sake of clearness.

The glass sheet 1 is drawn upwardly from the pool of molten glass 2 in the pot or receptacle 3, and is then preferably deflected into the horizontal plane about a bending roller 4. Although the type of machine here illustrated shows means for deflecting or bending the drawn sheet 1 into the horizontal plane, it is to be understood that my improved lateral tensioning device can equally well be used on vertical draw machines, or down-flow apparatus.

Adjacent each side of the pot 2, the edges of the sheet at their source are gripped between a pair of edge drawing rollers 5. These rollers function to positively feed glass from the pool 2 upwardly into the edges of the sheet in cooperation with the main drawing mechanism (not shown), which draws the sheet as a whole upwardly and over the bending roll 4. The rollers 5 in previous forms of this apparatus are driven at a slower peripheral speed than the main sheet drawing mechanism to cause an additional longitudinal tension in the edge portions of the sheet between the source and the bending roll 4. As partially illustrated in Fig. 1, the driving and supporting shaft 6 for each roller 5 is carried by a housing 7, supported on a frame structure 8 adjacent the side of the pot. The pair of shafts 6 for driving each pair of rollers 5 are geared together to turn at the same speed but in opposite directions, and one shaft of the pair is driven through bevel gears 9 from a suitable drive shaft 10. A cooling medium is constantly circulated through each roller 5 and supporting shaft 6, the cooling medium passing in through an inlet pipe 11 and out through an outlet pipe 12. All of the above is substantially as disclosed in numerous prior patents granted to I. W. Colburn, for example Patent No. 1,248,809, granted December 4, 1917.

According to the present invention a vertical standard 13 is fixed to the supporting structure 8, and pivoted to this standard 14 is tiltable base 15. The opposite end of the base 15 is adjustably supported by turnbuckles 16, whose ends are attached respectively to base 15 and the supporting structure 8. By suitably adjusting the turnbuckles 16 the inclination of the base plate 15 with respect to the horizontal plane may be varied as desired.

A carrier plate 17 is slidably secured in base 15 by the dove-tail flanges 18 at either edge thereof. An adjusting screw 19 is threaded as at 20 through a downwardly extending lug 21 on carrier plate 17. The inner end of the screw 19 is rotatably mounted in a lug 22 on the base 15, and is held from longitudinal movement through the lug by collars 23 at either side thereof. The outer end of the screw 19 is guided through a lug 24, extending downwardly from the carrier plate 17, and at its extreme outer end screw 19 is provided with a hand-wheel 25. By suitably turning the hand-wheel 25, the carrier plate 17 may be moved in or out along the supporting base 15 and held in adjusted position.

A pair of shaft holders 26 are pivoted at their rear ends by pins 27 in hubs 28 on carrier plate 17. The forward end of these shaft holders swing toward or from one another and are held down against carrier plate 17 by bolts 29 secured in slots 30 in holders 26 to allow a limited swinging movement of the forward ends of the holders.

In bearings 31 carried by the forward ends of holders 26 are mounted tubular sleeves 32 which have enlarged forward ends 33 serving as housings for the sheet-engaging discs and for driving mechanisms as hereinafter described. Hollow driving shafts 34 are mounted at their forward ends in the sleeves 32, and at their rear ends in split bearings 35 carried by holders 26. Back of the bearings 35 the two shafts 34 are geared together by intermeshing spur gears 36 so that they will always rotate at the same speed but in opposite directions. One of the gears 36 meshes with a driving pinion 37 on a drive shaft 38, receiving its power from some suitable outside source.

Each hollow disc-shaped sheet-engaging roller 39 has a tubular stud or journal 40 carried by suitable ball bearings 41 in a portion of the housing 33, as shown at the lower right-hand side of Fig. 2. The rear face of roller 39 is provided with an annular row of bevel gear teeth 42 which mesh with and are driven by a bevel gear 43 keyed to the end of shaft 34. The sheet-engaging face of roller or disc 39 is beveled at a suitable angle as indicated in Fig. 2, and this sheet-engaging surface is preferably roughened or knurled as shown at 44 to insure a positive engagement with the plastic glass forming the edge of the sheet.

When the rollers 5 are driven at a slow speed there is brought about a more marked checking or slowing down of the surface and body glass movements toward the border sections of the sheet from the side portions of the pot 3, which is followed by a speedier surface and body replacement movement toward the base of the sheet through and from the central section of the pot, the central current of the sheet-supplying glass taking a lateral swing toward the side portions of the base of the sheet adjacent the rollers 5, leaving the glass that occupies the side portions of the pot as a more or less inactive supply.

On the other hand, when the rollers 5 are driven at a faster speed or at a peripheral speed that approaches the speed of the main drawing means or approximately the speed of the central section of the sheet area near its base, there occurs a reduction or slacking off in tension along the adjacent and border portions of the sheet, the sheet edge in the glass body which comprises the most adjacent portion of the sheet base next to the edge tending to move slantwise inward toward the center of the sheet area, resulting in a decrease in the width of the sheet and a more marked tendency for waves therein.

As has been noted, shaft 34, roller 39, and housing 33 are hollowed, and a cooling medium such as water or air is adapted to be passed continuously through these parts to prevent overheating thereof. This fluid will flow in through a flexible pipe 50, through a stationary pipe 49, secured in housing 33, and projected loosely through journal 40 to the interior 48 of roller 39. The fluid discharged from pipe 49 will flow out from space 48 around pipe 49 and through passage 47 to the interior 46 of the housing 33, and from there out through the hollow drive shaft 34. If air is used as a cooling medium it may be allowed to escape from the open end of the shaft 34. If water or other cooling medium is used a stationary exit pipe 45 will be mounted with one end in communication with the rear end of the drive shaft 34 and the fluid will flow out through this pipe 45 which may conveniently extend down through the pivot pins 27 and hubs 28 as shown in Figs. 2 and 3.

When these devices are in operation the plastic glass which is being drawn into sheet form will be gripped immediately after the sheet edges are formed by the rollers 5 and moved positively outwardly and upwardly toward this initial forming period to stretch the sheet laterally. This will not only create a wider sheet but will provide a desirable amount of lateral tension in the sheet which will tend to eliminate waves and other thickness defects in the sheet which might otherwise occur from the natural tendency of the sheet to contract during the drawing operation.

As has already been noted the edge forming rollers 5 are usually driven considerably slower than the main sheet drawing mechanism in order to provide an additional tension in the edges of the sheet which assists in forming the sheet and holding the same to the proper constant width.

Since the addition of the stretching discs 39 causes the edge portion of the sheet to follow a considerably longer path than would otherwise be the case, the enforced longer path of travel will produce a desired additional transverse tension in the sheet area and along the sheet edge, and the edge forming rollers 5 may be driven much faster than has heretofore been the case. In this manner the drawing rate for the glass adjacent the edge portions of the sheet 2 will be increased and the glass movement in the pot near these locations will be correspondingly increased, and the occasion for stagnation and consequent devitrification along the side portions of the glass in the pot will be largely eliminated.

The cooling effect along the border portions of the sheet from each one of the opposite sets of discs or members 39 makes the glass in these localities less yieldable and more tractile and thus facilitates the creation of tension and also enables this glass to sustain a much greater drawing force, causing the main sheet area or that section which is above the discs is held as between two rigid frames during its upward movement from the point of grip of the disc rollers.

The discs 39 may be rotated by any approved form of variable speed drive, and may operate higher up along the sheet edge than is shown in Fig. 1, and also further out from each edge of the glass supply meniscus in the pot depending upon how wide a sheet is to be drawn and how much lateral stress is required for the best results in maintaining a flat sheet during the drawing of different thicknesses and sizes of sheet glass.

With relation to the knurled rollers 5, the speed of the discs 39 should be such, under most conditions of operations, as to progressively increase the speed of the movement of the sheet feeding glass in a fan-out fashion from the emergence zone toward that locality of the sheet which lies intermediate the points of operation of the opposite sets of discs.

In order to maintain enough yieldability in the upper portion of the sheet edge and the adjacent section of the sheet to enable its bending over the roll 4, heat should be applied to the opposite surface of the sheet at these localities above the disc rollers 39, and sometimes below the same, and also under some conditions at the point where the discs operate on the sheet.

The peripheral speed of the discs 39 at their point of closest contact with the sheet should preferably be less than the speed of the sheet edge at the bending roll, thereby insuring a suitable degree of tension along the edges between the discs and the bending roll.

In Fig. 5, coolers 60 are shown for the purposes of giving greater tractability to the surface layer of the sheet supplying glass in the pot 3.

A rod or bolt 51 is slidable through housing 52 formed centrally on the carrier plate 17, and the forward end of this rod is connected through the pair of similar links 53 with the forward ends of holders 26. A compression spring 54 surrounds the rear end of rod 51, and is confined between housing 52 and adjusting nuts 55 on the end of the rod. As this spring 54 is under compression it will tend to draw the rod 51 to the left, Fig. 2, and through links 53 move the forward ends of holders 26 toward one another. This will tend to clamp the discs 39 yieldably against the glass sheet 1.

Collars 56 at the rear ends of sleeves 32 are formed on their lower peripheries with worm teeth 57 meshing with adjacent worms 58 mounted in bearings 59 on carrier plate 17. By rotating the worm 58 by means of a suitable key applied to the squared end 60 of its supporting shaft, the collar 56 and sleeve 32 may be rotated as desired in either direction, its inclination being indicated by pointer 61 on the scale 62 shown in Fig. 4. In this way the inclination of each disc 39 may be adjusted with relation to the vertical plane of the glass sheet 1, and the point of closest contact of the two discs with the edge of the glass sheet may be moved to various points through the lower arc of the two discs.

The entire mechanism may be swung up or down to vary the position of the sheet-engaging discs with relation to the sheet edge and to the edge-forming rollers 5 by suitable adjustment of the turn buckles 16 which move up and down the outer end of base plate 15. The sheet-engaging mechanisms at the two sides of the sheet are duplicates and the description just given of the one will suffice for both.

Before moving the sheet-engaging discs into operative position, the tension of the spring 54 should be adjusted so that the operator can separate the two discs sufficiently to bring them into engaging position about the sheet edge. The worms 60 should also be adjusted to bring the point of closest contact between the two discs at the desired point in the sheet-engaging arc. After this is done the mechanism is advanced toward the sheet edge by means of screw 19, and the rollers 39 are then separated and allowed to clamp about the edge of the sheet 1. In connection with this new mechanism the sheet edge forming rolls 5 are driven faster than has heretofore been the case, as will more fully be explained hereinafter. The rollers or discs 39 should be driven at such a speed that their peripheries move at a somewhat greater rate than the peripheral speed of the edge forming rollers 5 to exert a pull or tension in the sheet glass between these two sheet gripping devices. As the plastic edge portion of the sheet is gripped between the two surfaces 44 of the discs 39, these sheet edges will be drawn upwardly and outwardly to positively increase the width of the sheet through this zone. After the discs are in suitable drawing engagement with the sheet edge the screw shaft 29 should be rotated to move the discs 39 bodily outward until this stretching mechanism is brought to the desired maximum. By suitably adjusting turn buckle 16, the relative angle of the sheet-engaging arcs of the discs 39 may be varied through a considerable range to obtain the most effective drawing engagement with the sheet.

In Figs. 6 and 7, the action of the sheet being drawn is clearly set forth. In Fig. 6 is shown the formation of the sheet before my improved discs have been applied to the edges above the rolls 5. In Fig. 7, the sheet is shown after it has been stretched by my improved mechanism. The discs are not shown in this view for the sake of clearness. As is seen, the sheet is given a lateral stretch directly above the knurled rolls 5 to increase the width of the sheet, thus preventing or overcoming the natural tendency of the sheet to narrow away after it leaves the knurled rolls 5. It is obvious that this lateral drawing and tensioning of the glass, which is being drawn into flat formation will overcome any tendencies which may be present for the sheet forming glass to contract and wave.

Attention is called to the path followed by the sheet supplying meniscus 70, which, as shown in Fig. 7, is pulled outwardly by the action of the discs 39, thus supplying sufficient glass material to build up the desired edge of sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. An apparatus for drawing sheet glass, means for drawing the sheet from a molten pool, means for feeding molten glass from the pool into the edge portions of the sheet, and means positioned directly above the feeding means for gripping the sheet edges and drawing them outwardly and upwardly while still plastic through an arcuate path.

2. An apparatus for drawing sheet glass, including a source of molten glass, means for drawing a sheet from the molten glass, means for feeding molten glass from the source into the edge portions of the sheet, and a pair of tilted discs engaging each sheet edge between the most closely positioned portions of their exposed faces immediately above the feeding means, and drawing the sheet edge outwardly and upwardly.

3. An apparatus for drawing sheet glass, including a source of molten glass, means for drawing a sheet from the molten glass, means for feeding molten glass from the source into the edge portions of the sheet, a pair of tilted discs engaging each sheet edge between the most closely positioned portions of their exposed faces immediately above the feeding means, and drawing the sheet edge outwardly and upwardly, and means for internally cooling the discs.

4. An apparatus for drawing sheet glass, including a source of molten glass, means for drawing a sheet from the molten glass, means for feeding molten glass from the source into the edge portions of the sheet, a pair of tilted discs engaging each sheet edge between the most closely positioned portions of their exposed faces immediately above the feeding means, and drawing the sheet edge outwardly and upwardly, and means for varying the angular relation of the sheet-engaging faces of the discs.

5. An apparatus for drawing sheet glass, including a source of molten glass, means for drawing a sheet from the molten glass, means for feeding molten glass from the source into the edge portions of the sheet, a pair of tilted discs engaging each sheet edge between the most closely positioned portions of their exposed faces immediately above the feeding means, and drawing the sheet edge outwardly and upwardly, and means for adjustably supporting the discs so that they may be moved inwardly or outwardly with relation to the median portion of the sheet.

6. An apparatus for drawing sheet glass, including a source of molten glass, means for drawing a sheet from the molten glass, means for feeding molten glass from the source into the edge portions of the sheet, a pair of tilted discs engaging each sheet edge between the most closely positioned portions of their exposed faces immediately above the feeding means, and drawing the sheet edge outwardly and upwardly, and means for adjusting the discs toward or from the feeding means.

7. The process of drawing sheet glass, consisting in drawing the sheet upwardly from a bath of molten glass, applying auxiliary drawing power to the sheet edges at their source and then immediately drawing the sheet edges outwardly and upwardly to stretch the sheet laterally between said edges while still plastic.

8. In sheet glass apparatus, including means for containing a mass of molten glass, means for drawing a sheet therefrom, rotatable means for feeding molten glass from the molten mass into the edge portions of the sheet, and means positioned directly above the feeding means for drawing the sheet edges outwardly in a manner that the sheet will retain the maximum width reached.

9. In sheet glass apparatus, including means for containing a mass of molten glass, means for drawing a sheet therefrom, means for feeding molten glass from the molten mass into the edge portions of the sheet, and disc members arranged above the feeding means for moving the sheet edges outwardly.

10. In sheet glass apparatus, including means for containing a mass of molten glass, means for drawing a sheet therefrom, rotatable means for feeding molten glass from the molten mass into the edge portions of the sheet and means independent of but cooperating with said feeding means for moving the sheet edges outwardly.

11. In sheet glass apparatus, including means for containing a mass of molten glass, means for drawing a sheet therefrom, rotatable means for feeding molten glass from the molten mass into the edge portions of the sheet, and means independent of but arranged thereabove and cooperating with said feeding means for moving the sheet edges outwardly.

12. An apparatus for drawing sheet glass, including means for drawing the sheet from a source of molten glass, means for feeding molten glass from the source into the edge portions of the sheet, a pair of tilted discs engaging each sheet edge between the most closely positioned portions of their exposed faces immediately above the feeding means, means for varying the inclination of said discs relative to the sheet, and means for indicating the inclination of said discs.

13. An apparatus for drawing sheet glass, including means for drawing the sheet from a source of molten glass, means for feeding molten glass from the source into the edge portions of the sheet, a pair of tilted discs engaging each sheet edge between the most closely positioned portions of their exposed faces immediately above the feeding means, and means engaging said discs for rotating the same.

Signed at Toledo, in the county of Lucas, and State of Ohio, this 27th day of October, 1924.

ENOCH T. FERNGREN.